(12) United States Patent
Ashimine

(10) Patent No.: US 12,313,846 B2
(45) Date of Patent: May 27, 2025

(54) DISPLAY DEVICE

(71) Applicant: Alps Alpine Co., LTD, Tokyo (JP)

(72) Inventor: Katsunari Ashimine, Fukushima (JP)

(73) Assignee: Alps Alpine Co., LTD, Tokyo (JP)

( * ) Notice: Subject to any disclaimer, the term of this patent is extended or adjusted under 35 U.S.C. 154(b) by 548 days.

(21) Appl. No.: 17/703,033

(22) Filed: Mar. 24, 2022

(65) Prior Publication Data

US 2022/0308348 A1    Sep. 29, 2022

(30) Foreign Application Priority Data

Mar. 26, 2021   (JP) ................................. 2021-052706

(51) Int. Cl.
| | |
|---|---|
| *G02B 27/01* | (2006.01) |
| *F21V 8/00* | (2006.01) |
| *G02B 27/28* | (2006.01) |
| *G06F 3/044* | (2006.01) |

(52) U.S. Cl.
CPC ....... *G02B 27/0101* (2013.01); *G02B 6/0055* (2013.01); *G02B 27/283* (2013.01); *G06F 3/044* (2013.01)

(58) Field of Classification Search
CPC .............. G02B 27/0101; G02B 6/0055; G02B 27/283; G06F 3/044
USPC ....................................................... 359/630
See application file for complete search history.

(56) References Cited

U.S. PATENT DOCUMENTS

| | | |
|---|---|---|
| 2018/0188550 A1 | 7/2018 | Frayne et al. |
| 2018/0284470 A1 | 10/2018 | Yamamoto et al. |

FOREIGN PATENT DOCUMENTS

| | | |
|---|---|---|
| CN | 212675516 | 3/2021 |
| JP | H09506717 A | 6/1997 |
| JP | 2017-107165 | 6/2017 |
| JP | 2018-81138 | 5/2018 |
| JP | 2019-66833 | 4/2019 |
| JP | 2019-101055 | 6/2019 |
| JP | 2022139533 A | 9/2022 |
| WO | 2017/098718 | 6/2017 |
| WO | WO 2018/042830 A1 | 3/2018 |
| WO | 2018/151220 | 8/2018 |

OTHER PUBLICATIONS

Extended European Search Report issued Sep. 12, 2022 in corresponding European Patent Application No. 22162944.7.
Office action in Japanese application No. 2021-052706, dated Jul. 2, 2024, 6 pages (with English translation).

*Primary Examiner* — Jerry L Brooks
(74) *Attorney, Agent, or Firm* — Crowell & Moring LLP

(57) ABSTRACT

Implementations of a display device of the present disclosure include a transparent light guide plate in which a light guide plate image that is an original video of an aerial image is formed on a bottom portion, a light source configured to emit light L from a side portion of the light guide plate toward the inside of the light guide plate, a polarization beam splitter disposed in parallel with the light guide plate and above the light guide plate, a λ/4 plate disposed below the light guide plate, and a retroreflective member disposed in parallel with the light guide plate and below the λ/4 plate, which retroreflects the light guide plate image to display the aerial image.

12 Claims, 5 Drawing Sheets

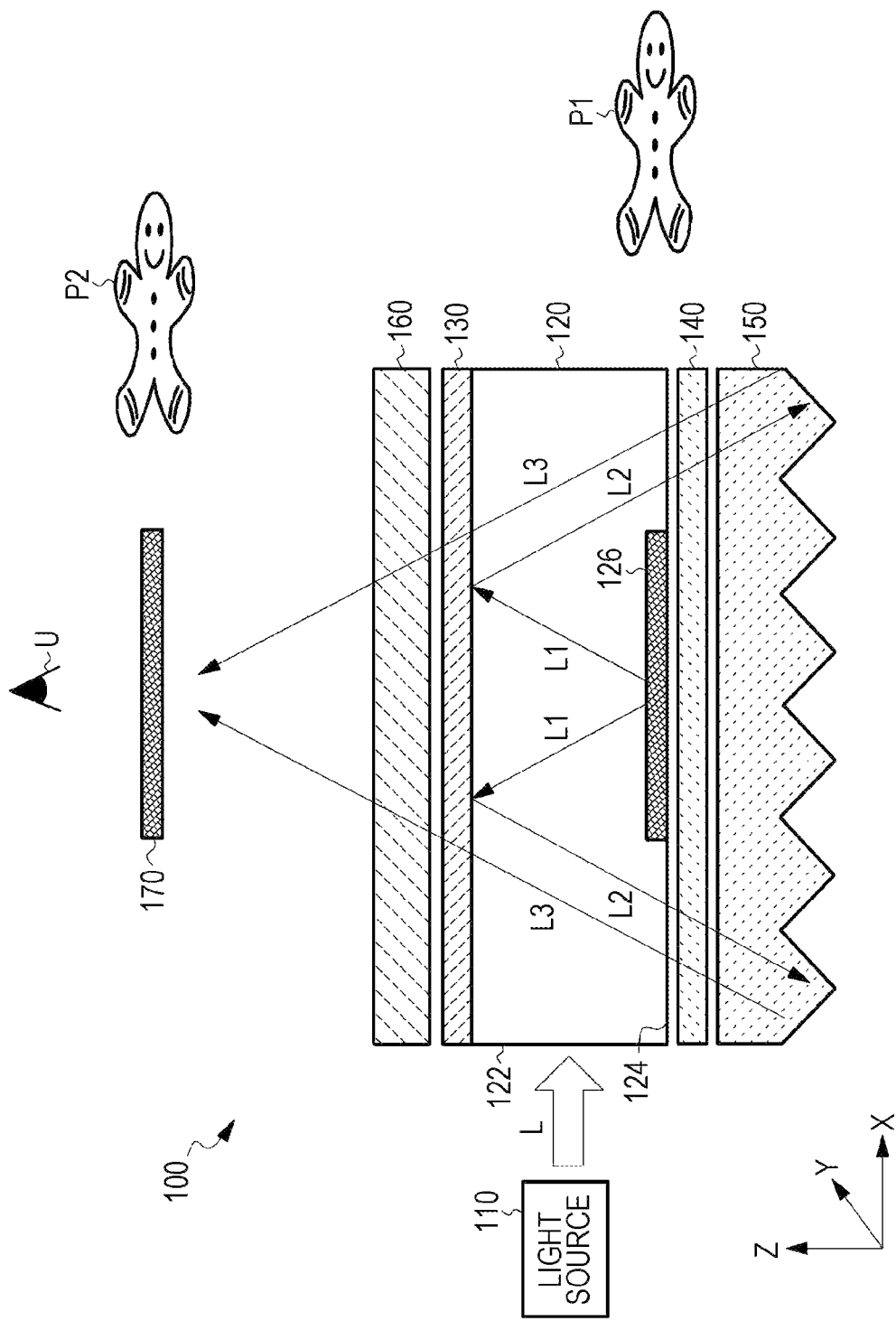

DISPLAY DEVICE

RELATED APPLICATION

The present application claims priority to Japanese Patent Application Number 2021-052706, filed Mar. 26, 2021 the entirety of which is hereby incorporated by reference.

BACKGROUND

1. Field of the Disclosure

The present disclosure relates to a display device, and particularly to a display device that displays an image in the air using retroreflection.

2. Description of the Related Art

An aerial display that forms an image displayed on a display in the air using a retroreflective member or the like has been proposed. For example, in order to enable observation of an image formed in the air from a wider angle, the display device of JP 2017-107165 A uses two retroreflective members, and one of the retroreflective members is disposed on an emission axis of a light source. In an image display device of JP 2018-81138 A, in order to facilitate adjustment of an image forming position of an image, a semitransparent mirror, a retroreflective member, and an image output device are arranged parallel to each other, and a position of the semitransparent mirror or the image output device is changed so that the image forming position can be adjusted. In an image display device of JP 2019-66833 A, in order to curb a decrease in visibility of an image, the number of times of light transmission through the phase difference member λ/4 plate) is reduced, and hardly any dust or the like is able to enter between a retroreflective member and a phase difference member. In an aerial video display device of JP 2019-101055 A, in order to reduce the thickness of the device, a display and a retroreflective member are arranged parallel to a beam splitter, and a deflection optical element is disposed on the display.

SUMMARY

FIG. 1A illustrates a schematic cross section of a display device using conventional retroreflection. As illustrated in the drawing, the display device 10 includes a display 20 that outputs an image, a beam splitter 30, and a retroreflective member 40. The light emitted from the display 20 is reflected by the beam splitter 30, and the reflected light travels to the retroreflective member 40. The retroreflective member 40 reflects light in the same direction as incident light, and the reflected light passes through the beam splitter 30, and an aerial image 50 is displayed in a space in front of the observer's eyes. Such display of the aerial image 50 is known as an Aerial Imaging by Retro-Reflection (AIRR) method.

FIG. 1B is a schematic external view of the display device using the AIRR method. The display device 10 includes, for example, a rectangular parallelepiped housing 60 as illustrated in the drawing, the beam splitter 30 is disposed on the surface of the housing 60, and the display 20 and the retroreflective member 40 are disposed inside the housing 60. Since the housing 60 requires an internal space for the display 20 and the retroreflective member 40 to be inclined, the thickness T of the housing 60 increases.

In addition, the aerial image 50 that can be observed by the observer is limited to a range in which the observer can see the retroreflective member 40. That is, the retroreflective member 40 needs to be present within the viewing angle of the observer. When FIG. 1B is taken as an example, the viewing angle θ at which the aerial image 50 can be observed is about ±10 degrees to the left and right with respect to in front of the aerial image 50, and there is a problem in that the viewing angle is narrow.

Further, the aerial image 50 is formed at a position symmetrical to the display 20 with respect to the surface of the beam splitter 30. In a case where the display 20 is inclined at approximately 45 degrees with respect to the beam splitter 30, the aerial image 50 observed by the observer is not a video of the display 20 viewed from in front but a video viewed from an oblique direction of 45 degrees.

An object of the present disclosure is to address such conventional problems, and to provide a display device capable of achieving thickness reduction, size reduction, and wide field of view, and enabling front viewing of a video of a light source, and a spatial input device using the display device.

One form of a display device according to the present disclosure that is configured to display a video in the air using retroreflection includes a transparent light guide plate including an original video of the video in the air, a light source configured to emit light from a side portion of the light guide plate toward the inside of the light guide plate, a polarization beam splitter disposed parallel to the light guide plate and above the light guide plate, a λ/4 plate disposed below the light guide plate, and a retroreflective member disposed parallel to the light guide plate and below the λ/4 plate, and retroreflects the original video to display the video in the air.

In some implementations, the display device further includes a polarizing member provided between the original video of the light guide plate and the polarization beam splitter, in which the polarizing member is configured to curb transmission of light reflected by the original video through the polarization beam splitter. In some implementations, the polarizing member has a shape that is the same as or similar to a planar shape of the original video. In some implementations, the original video is formed on a bottom portion of the light guide plate, and the original video and an image in the air are at symmetrical positions with respect to a plane of the polarization beam splitter.

Implementations of a spatial input device according to the present disclosure include the display device described above, and a detection unit configured to detect an approach of an object to a video in the air displayed by the display device. In some implementations, the detection unit includes a capacitive sensor.

According to the present disclosure, since the light is emitted from the side portion of the transparent light guide plate on which the original video of the aerial image is formed, and the video in the air of the original video is displayed by the retroreflection of the retroreflective member disposed below the light guide plate in parallel with the light guide plate, the display device can be downsized and thinned, and the observer can observe the video in the air of the original video viewed from the front at a wide viewing angle.

BRIEF DESCRIPTION OF THE DRAWINGS

FIG. 2 is a diagram illustrating a schematic cross section of a display device according to a first example of the present disclosure;

DETAILED DESCRIPTION

Figure 1A:
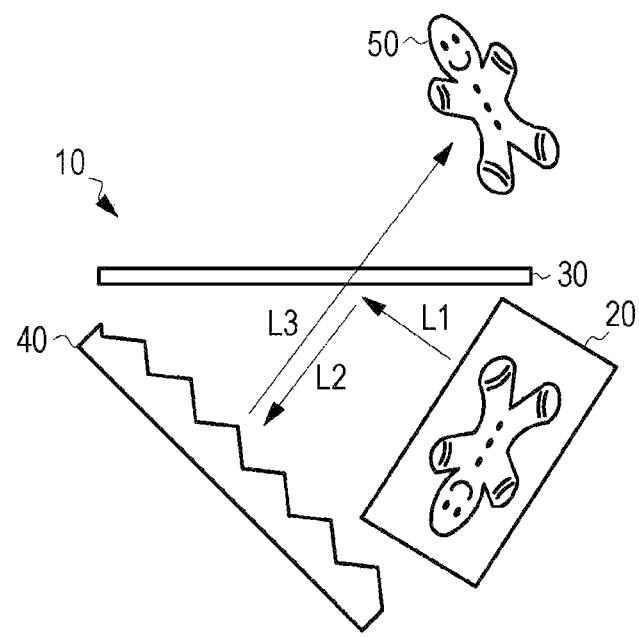
FIG. 1A is a schematic cross-sectional view of a conventional AIRR type display device.

Embodiments and implementations of the present disclosure will be described below. Implementations of a display device of the present disclosure displays a video using retroreflection in a three-dimensional space for which wearing special glasses or the like do not have to be worn. In an aspect, the display device of the present disclosure is applied to a user input interface using a video displayed in the air. It should be noted that the drawings referred to in the following description of the examples include exaggerated display in order to facilitate understanding of the disclosure, and do not directly represent the shape and scale of an actual product.

Next, an example of the present disclosure will be described in detail. FIG. 2 is a cross-sectional view illustrating a schematic configuration of a display device according to an example of the present disclosure. A display device 100 of the present example includes a light source 110, a light guide plate 120, a polarization beam splitter 130, a λ/4 plate 140, a retroreflective member 150, and a transparent protective member 160. These members are accommodated in, for example, a rectangular parallelepiped housing, a housing, or the like.

The light source 110 emits light L having a constant emission angle (or oblique angle) in the X-direction. The emitted light L enters the inside from a side portion 122 of the transparent light guide plate 120, and uniformly irradiates the inside of the light guide plate 120. The light source 110 is not particularly limited, but for example, a light emitting diode, a laser diode, or the like may be used. If the side portion 122 of the light guide plate 120 has a certain length in the Y-direction, the plurality of light sources 110 may be arranged along the Y-direction of the side portion 122 of the light guide plate 120. Here, light is incident from one side portion of the light guide plate 120, but the light may be incident from a plurality of side portions.

The light guide plate 120 is a transparent plate-like optical member including a flat upper surface, a flat lower surface, and side surfaces connecting the upper surface and the lower surface. A known plate can be used as the light guide plate 120, and may be, for example, an acrylic plastic plate, or a plate made of a polycarbonate resin, a cycloolefin-based resin, or the like. The light guide plate 120 has a constant thickness in the Z-direction in order to allow light L of the light source 110 to enter from the side portion 122. A diffusion pattern for diffusing the incident light may be formed on the bottom portion or a bottom surface 124 of the light guide plate 120. For example, a dot pattern may be formed by laser processing or printing. In this way, the light L incident from the side portion 122 of the light guide plate 120 is diffused or scattered by the diffusion pattern of the bottom portion 124 of the light guide plate 120, and the light guide plate 120 functions as if it were a surface light source.

A light guide plate image 126 is further formed on the bottom portion or the bottom surface 124 of the light guide plate 120 as an original video P1 of the aerial image. A method of forming the light guide plate image 126 is not particularly limited, but for example, a two-dimensional image such as a groove or unevenness may be formed on the bottom portion 124 by laser processing, embossing, printing processing, or the like. When the light L is incident from the side portion of the light guide plate 120, the light L is reflected by the light guide plate image 126, and the two-dimensional original video P1 is generated. When it is desired to further increase the luminance of the light guide plate image 126, the degree of diffusion or scattering of the bottom portion 124 in the region other than the light guide plate image 126 may be reduced.

The polarization beam splitter 130 is disposed on the upper portion of the light guide plate 120 in parallel with the light guide plate 120. The polarization beam splitter 130 is a polarization separation element capable of dividing incident light into a p-polarization component and an s-polarization component, and can transmit a light component linearly polarized in a certain specific direction. If the light L incident from the light source 110 is non-polarized light including various polarized components, a part of light L1 reflected by the bottom portion 124 of the light guide plate 120 or the light guide plate image 126 passes through the polarization beam splitter 130, and most of the other light L2 is reflected by the polarization beam splitter 130. If the light L incident from the light source 110 is linearly polarized light, the direction of the linearly polarized light transmitted by the polarization beam splitter 130 is set to be different from the direction of the linearly polarized light of the incident light L, and most of the light L1 is reflected by the polarization beam splitter 130.

The λ/4 plate 140 is disposed below and parallel to the light guide plate 120. The light L2 emitted from the light guide plate 120 is incident on the λ/4 plate 140, and a phase difference π/2 (90 degrees) is given to the incident light L2 to allow transmission of the incident light L2. For example, when linearly polarized light is incident, it is converted into circularly polarized light (or elliptically polarized light), and when circularly polarized light (or elliptically polarized light) is incident, it is converted into linearly polarized light.

The retroreflective member 150 is disposed below and parallel to the λ/4 plate 140. The retroreflective member 150 reflects the light L2 transmitted through the λ/4 plate 140 and the light L3 in the same direction as the incident light. The structure and material of the retroreflective member 150 are not particularly limited as long as the retroreflective member can reflect light in the same direction as the incident direction. The retroreflective member 150 includes, for example, prismatic retroreflective elements such as triangular pyramid retroreflective elements and full cube corner retroreflective elements, or bead retroreflective elements.

When the light L3 reflected by the retroreflective member 150 is transmitted through the λ/4 plate 140 again, a phase difference π/2 is given. Thus, the light L3 transmitted through the λ/4 plate 140 has a phase difference π from the light L2 incident on the λ/4 plate 140. For example, if the light incident on the λ/4 plate 140 is linearly polarized light, the light becomes circularly polarized light (or elliptically polarized light) when passing through the λ/4 plate 140, when the circularly polarized light is retroreflected an odd number of times by the retroreflective member 150, the circularly polarized light becomes circularly polarized light in the opposite direction, and when this circularly polarized light in the opposite direction passes through the λ/4 plate 140, it becomes linear polarized light in a direction 180 degrees different from the original linear polarized light. Thus, when the light L3 transmitted through the λ/4 plate 140 is incident on the polarization beam splitter 130, most of the light L3 is transmitted through the polarization beam splitter 130.

A transparent protective member 160 is disposed above the polarization beam splitter 130. The transparent protective member 160 is made of, for example, a glass material or a plastic material. The transparent protective member 160 protects the surface of the polarization beam splitter 130, and the arrangement thereof is arbitrary. The light L3 transmitted through the transparent protective member 160 forms an image in the air, and the observer can observe the aerial image 170 immediately in front from a viewpoint U. The aerial image 170 is a video P2 in which an original video P1 of the light guide plate image 126 is floated upward as it is. That is, the aerial image 170 is displayed at a position symmetrical to the light guide plate image 126 with respect to the plane of the polarization beam splitter 130, and the observer can see the video P2 that is a front view of the original video P1.

Figure 1B:
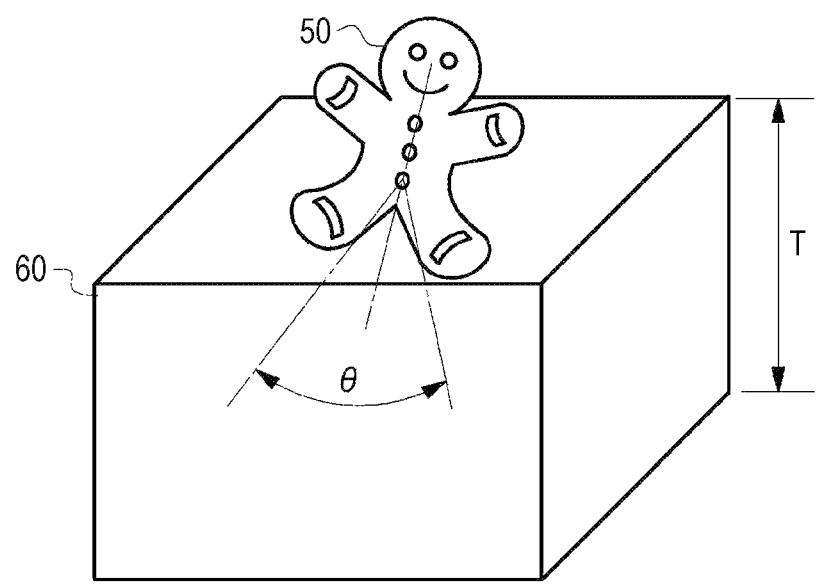
FIG. 1B is a schematic external view of the conventional display device.
Figure 3:
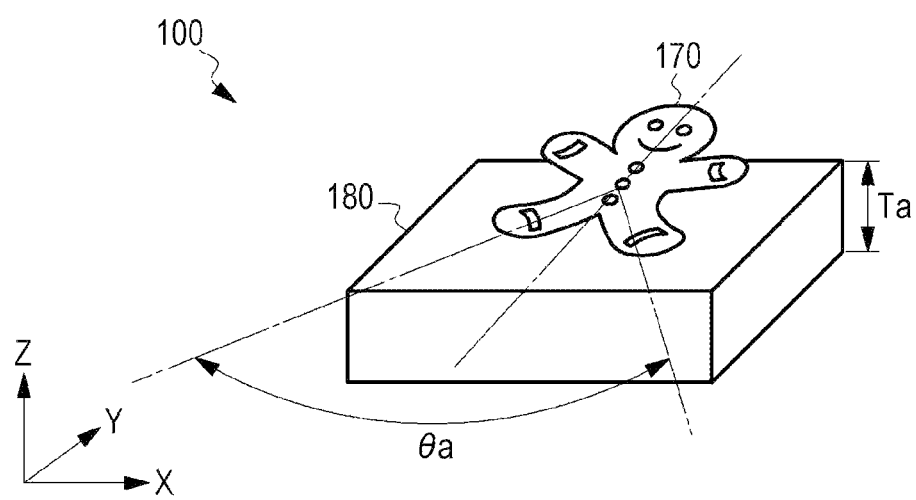
FIG. 3 is a schematic external view of the display device according to the first example of the present disclosure.

FIG. 3 is a schematic external perspective view of the display device of the present example. In the display device 100, for example, the transparent protective member 160 is disposed on the surface of the rectangular parallelepiped housing 180, and the light source 110, the light guide plate 120, the polarization beam splitter 130, the λ/4 plate 140, and the retroreflective member 150 are accommodated therein. Since the retroreflective member 150 is disposed in parallel to the light guide plate 120, the polarization beam splitter 130, and the λ/4 plate 140 without inclining the retroreflective member as in the conventional display device, a thickness Ta of the housing 180 in the Z-direction can be reduced. In addition, since the light source 110 is disposed on the side portion of the light guide plate 120, this also contributes to thinning of the housing 180. Furthermore, since the retroreflective member 150 is disposed horizontally in the X-direction, the range in the X-direction in which the retroreflective member 150 can be observed from the viewpoint U of the observer is widened, so that the viewing angle θa in the X-direction in which the aerial image 170 can be viewed can be increased. The viewing angle θa of the present example is at least twice the viewing angle θ of the conventional display device 10 illustrated in FIG. 1. Similarly, since the range in the Y-direction in which the retroreflective member 150 can be viewed from the viewpoint U is also widened, the viewing angle in the Y-direction is also widened.

Next, a second example of the present disclosure will be described. In the first example, since a part of the component of the light L1 reflected by the light guide plate image 126 is transmitted through the polarization beam splitter 130, the observer views both the original video P1 by the transmitted light and the video P2 of the aerial image 170 by the retroreflection in a double manner. Therefore, in the second example, the original video P1 of the light transmitted through the polarization beam splitter 130 is made invisible.

Figure 4:
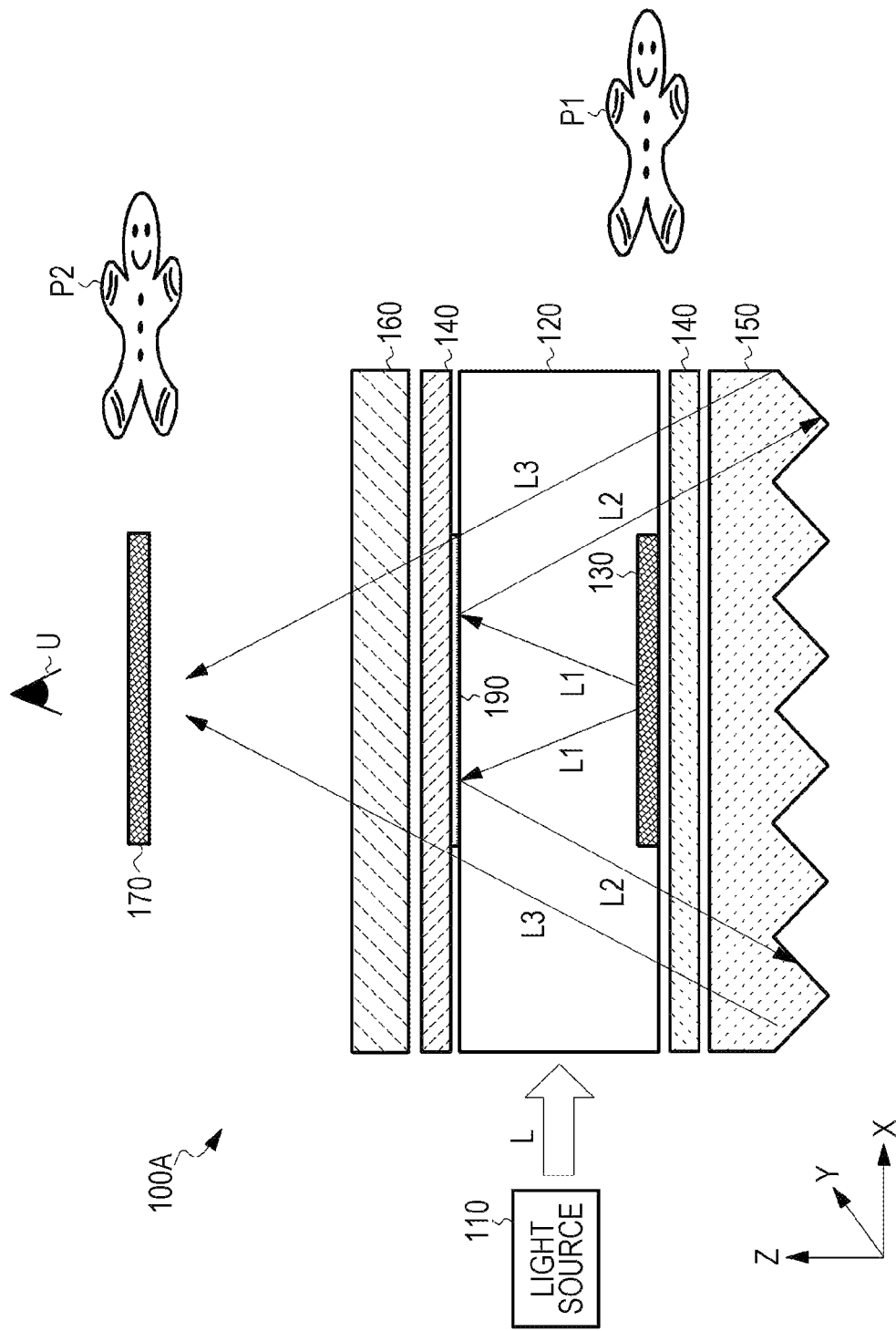
FIG. 4 is a diagram illustrating a schematic cross section of a display device according to a second example of the present disclosure.

FIG. 4 is a view illustrating a cross-sectional structure of a display device 100A according to a second example, where components that are the same as those in FIG. 2 are denoted by the same reference numerals. In the second example, a polarizing member (for example, a polarizing plate or a polarizing film) 190 having the same or similar shape as the light guide plate image 126 is disposed between the light guide plate image 126 and the polarization beam splitter 130. For example, the polarizing member 190 is disposed on the upper portion of the light guide plate 120 as illustrated in the drawing. The polarizing member 190 curbs transmission of the reflected light L1 of the light guide plate image 126 through the polarization beam splitter 130. For example, the polarizing member 190 transmits light in a direction different from the direction of linearly polarized light transmitted by the polarization beam splitter 130.

As described above, according to the present example, since the polarizing member 190 for curbing transmission of the reflected light L1 of the light guide plate image 126 through the polarization beam splitter 130 is provided between the light guide plate image 126 and the polarization beam splitter 130, the observer cannot see the original video P1, and the contrast and visibility of the aerial image 170 can be improved.

Figure 5:
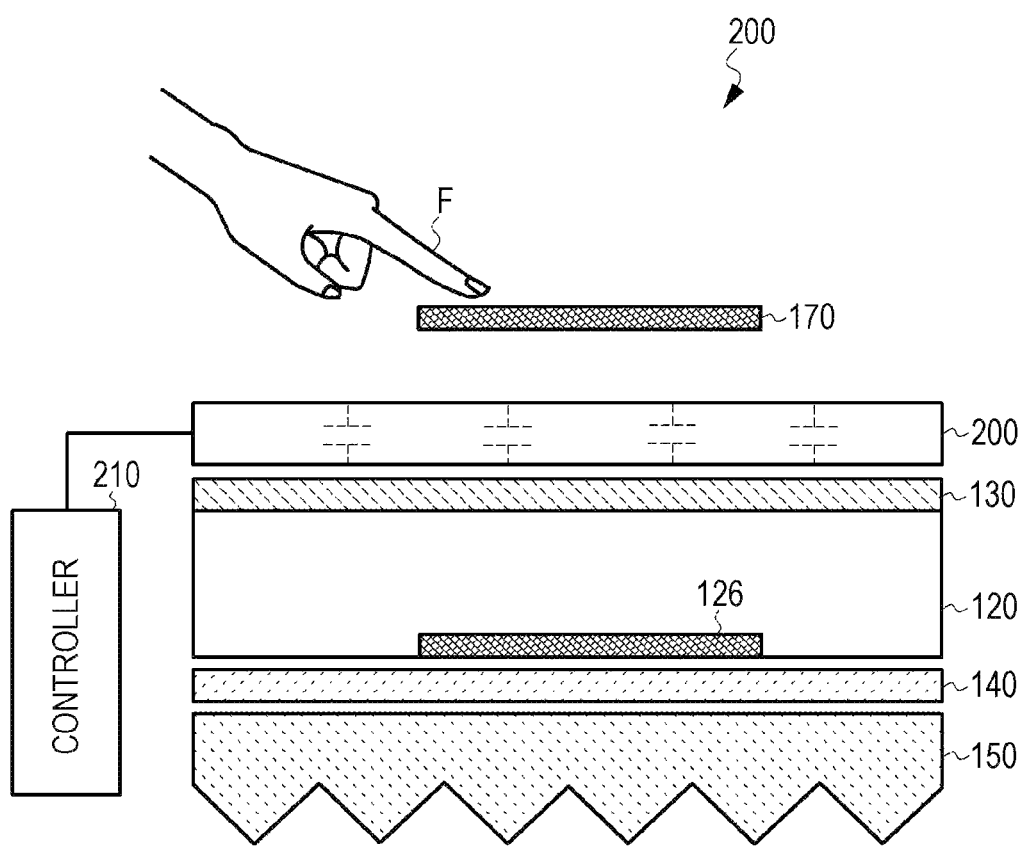
FIG. 5 is a diagram illustrating a schematic configuration of a spatial input device according to a third example of the present disclosure.

Next, a third example of the present disclosure will be described. A third example relates to a spatial input device in which the display device of the first or second example is applied to a user input interface. FIG. 5 is a diagram illustrating one form of a schematic configuration of a spatial input device according to the third example. The spatial input device 200 includes a sensor 200 that detects an object (for example, a user's finger or the like) on the aerial image 170 and a controller 210 that receives a detection result from the sensor 200 and performs various controls.

The sensor 200 is not particularly limited as long as it can transmit the aerial image 170, but for example, a non-contact capacitive sensor can be used. In this case, the transparent protective member 160 illustrated in FIG. 2 may be replaced with a capacitive sensor. The capacitive sensor detects a change in capacitance in a region where a conductor such as a user's finger approaches, like a capacitive touch panel. As illustrated in the drawing, when the user holds the finger F over the aerial image 170, the capacitive sensor 200 detects the approach of the finger to the aerial image 170 and outputs the detection result to the controller 210. As a result, the user can perform input in a non-contact manner. For example, a clean and hygienic input can be realized as compared with an input button touched by an unspecified person.

The spatial input device 200 of the present example can be applied to any user input, and can be applied to, for example, a computer device, an in-vehicle electronic device, an ATM of a bank or the like, a ticket purchasing machine of a station or the like, an input button of an elevator, and the like.

While there has been illustrated and described what is at present contemplated to be preferred embodiments of the present disclosure, it will be understood by those skilled in the art that various changes and modifications may be made, and equivalents may be substituted for elements thereof without departing from the true scope of the disclosure. In addition, many modifications may be made to adapt a particular situation to the teachings of the disclosure without departing from the central scope thereof. Therefore, it is intended that this disclosure not be limited to the particular embodiments disclosed, but that the disclosure will include all embodiments falling within the scope of the appended claims.

What is claimed is:

1. A display device configured to display a video in the air using retroreflection, the display device comprising:
   a transparent light guide plate including an original video of the video in the air;
   a light source configured to emit light from a side portion of the light guide plate toward the inside of the light guide plate;

a polarization beam splitter disposed parallel to the light guide plate and above the light guide plate;

λ/4 plate disposed below the light guide plate; and a retroreflective member disposed in parallel with the light guide plate and below the λ/4 plate, wherein the display device is configured to retroreflect the original video to display the video in the air.

2. The display device according to claim 1, further comprising:

a polarizing member provided between the original video of the light guide plate and the polarization beam splitter, wherein the polarizing member is configured to suppress transmission of light reflected by the original video through the polarization beam splitter.

3. A spatial input device comprising:

the display device according to claim 2; and a detection unit configured to detect an approach of an object to a video in the air displayed by the display device.

4. The spatial input device according to claim 3, wherein the detection unit includes a capacitive sensor.

5. The display device according to claim 2, wherein the polarizing member has a shape that is the same as or similar to a planar shape of the original video.

6. A spatial input device comprising:

the display device according to claim 5; and a detection unit configured to detect an approach of an object to a video in the air displayed by the display device.

7. The spatial input device according to claim 6, wherein the detection unit includes a capacitive sensor.

8. The display device according to claim 1, wherein the original video is formed on a bottom portion of the light guide plate, and the original video and an image in the air are at symmetrical positions with respect to a plane of the polarization beam splitter.

9. A spatial input device comprising:

the display device according to claim 8; and a detection unit configured to detect an approach of an object to a video in the air displayed by the display device.

10. The spatial input device according to claim 9, wherein the detection unit includes a capacitive sensor.

11. A spatial input device comprising:

the display device according to claim 1; and a detection unit configured to detect an approach of an object to a video in the air displayed by the display device.

12. The spatial input device according to claim 11, wherein the detection unit includes a capacitive sensor.

* * * * *